(12) United States Patent
Campbell et al.

(10) Patent No.: US 11,811,463 B2
(45) Date of Patent: Nov. 7, 2023

(54) SPEAKER OUTPUT FAULT MONITORING

(71) Applicant: Biamp Systems, LLC, Beaverton, OR (US)

(72) Inventors: Jacob Peter Campbell, Beaverton, OR (US); Aaron Faulstich, Beaverton, OR (US)

(73) Assignee: Biamp Systems, LLC, Beaverton, OR (US)

( * ) Notice: Subject to any disclaimer, the term of this patent is extended or adjusted under 35 U.S.C. 154(b) by 0 days.

(21) Appl. No.: 17/579,584

(22) Filed: Jan. 19, 2022

(65) Prior Publication Data

US 2022/0232335 A1 Jul. 21, 2022

Related U.S. Application Data

(60) Provisional application No. 63/139,805, filed on Jan. 21, 2021.

(51) Int. Cl.
| | |
|---|---|
| *H04B 17/309* | (2015.01) |
| *G10L 25/21* | (2013.01) |
| *G10L 25/18* | (2013.01) |
| *H04R 3/12* | (2006.01) |
| *H04R 5/04* | (2006.01) |
| *H04R 29/00* | (2006.01) |

(52) U.S. Cl.
CPC ............ *H04B 17/309* (2015.01); *G10L 25/18* (2013.01); *G10L 25/21* (2013.01); *H04R 3/12* (2013.01); *H04R 5/04* (2013.01); *H04R 29/002* (2013.01); *H04R 29/007* (2013.01)

(58) Field of Classification Search
None
See application file for complete search history.

(56) References Cited

U.S. PATENT DOCUMENTS

| | | | |
|---|---|---|---|
| 10,667,040 B1 * | 5/2020 | French | H03F 3/181 |
| 11,509,292 B2 * | 11/2022 | Marchais | G06F 3/016 |
| 2004/0202333 A1 | 10/2004 | Csermak et al. | |
| 2004/0247136 A1 * | 12/2004 | Wallace | H04R 29/001 |
| | | | 381/56 |
| 2005/0175105 A1 | 8/2005 | Gu et al. | |
| 2012/0045068 A1 | 2/2012 | Kim et al. | |
| 2013/0294609 A1 | 11/2013 | Tackett | |
| 2019/0124443 A1 | 4/2019 | Chang et al. | |

OTHER PUBLICATIONS

International Search Report issued in the International Application No. PCT/US22/13029, dated Apr. 28, 2022.

* cited by examiner

*Primary Examiner* — Paul W Huber

(57) ABSTRACT

An example process includes receiving a voltage input and a current input associated with one or more audio signals, bandpass filtering the voltage input and the current input, determining a root means square of the bandpass filtered portion, dividing the determined root means square of the voltage by the root means square of the current to identify an impedance value, and determining whether a fault has occurred based on the impedance value.

17 Claims, 10 Drawing Sheets

100

SPEAKER OUTPUT FAULT MONITORING

CROSS-REFERENCE TO RELATED APPLICATIONS

This application claims priority to previously filed provisional application No. 63/139,805, entitled 'SPEAKER OUTPUT FAULT MONITORING', which was filed on Jan. 21, 2021 and is hereby incorporated by reference in its entirety.

BACKGROUND

In a workplace, conference area, public forum or other environment, the audio producing speakers may be arranged in a configuration that covers multiple floors, areas and different sized rooms. It is not a simple task to monitor each of the outputs of the various speakers to determine whether faults have occurred and which speaker locations are not functioning properly at any particular time.

SUMMARY

One example embodiment may provide a method including one or more of monitoring a plurality of audio channels, determining an energy level of the plurality of audio channels, identifying a fault one or more of the plurality of audio channels based on the energy level, and determining whether the fault is a low confidence measurement or a high confidence measurement.

Another example embodiment may include an apparatus that includes a processor configured to perform one or more of monitor a plurality of audio channels, determine an energy level of the plurality of audio channels, identify a fault one or more of the plurality of audio channels based on the energy level, and determine whether the fault is a low confidence measurement or a high confidence measurement.

Still another example embodiment may include a non-transitory computer readable storage medium configured to store instructions that when executed cause a processor to perform monitoring a plurality of audio channels, determining an energy level of the plurality of audio channels, identifying a fault one or more of the plurality of audio channels based on the energy level, and determining whether the fault is a low confidence measurement or a high confidence measurement.

Still another example embodiment may include a method that includes one or more of receiving a voltage input and a current input associated with one or more audio signals, bandpass filtering the voltage input and the current input, determining a root means square of the bandpass filtered portion, dividing the determined root means square of the voltage by the root means square of the current to identify an impedance value, and determining whether a fault has occurred based on the impedance value.

Still another example embodiment may include an apparatus that includes a receiver configured to receive a voltage input and a current input associated with one or more audio signals, and a processor configured to bandpass filter the voltage input and the current input, determine a root means square of the bandpass filtered portion, divide the determined root means square of the voltage by the root means square of the current to identify an impedance value, and determine whether a fault has occurred based on the impedance value.

Still yet another example embodiment may include a non-transitory computer readable storage medium configured to store instructions that when executed cause a processor to perform one or more of receiving a voltage input and a current input associated with one or more audio signals, bandpass filtering the voltage input and the current input, determining a root means square of the bandpass filtered portion, dividing the determined root means square of the voltage by the root means square of the current to identify an impedance value; and determining whether a fault has occurred based on the impedance value.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

In fault detection systems including certain speakers, microphones or similar products, such as passive emitters (i.e., speakers), certain procedures will detect basic short circuits or related faults. For example purposes, a passive emitter may be any passive device which is controlled by a voltage supplied circuit.

Figure 1:
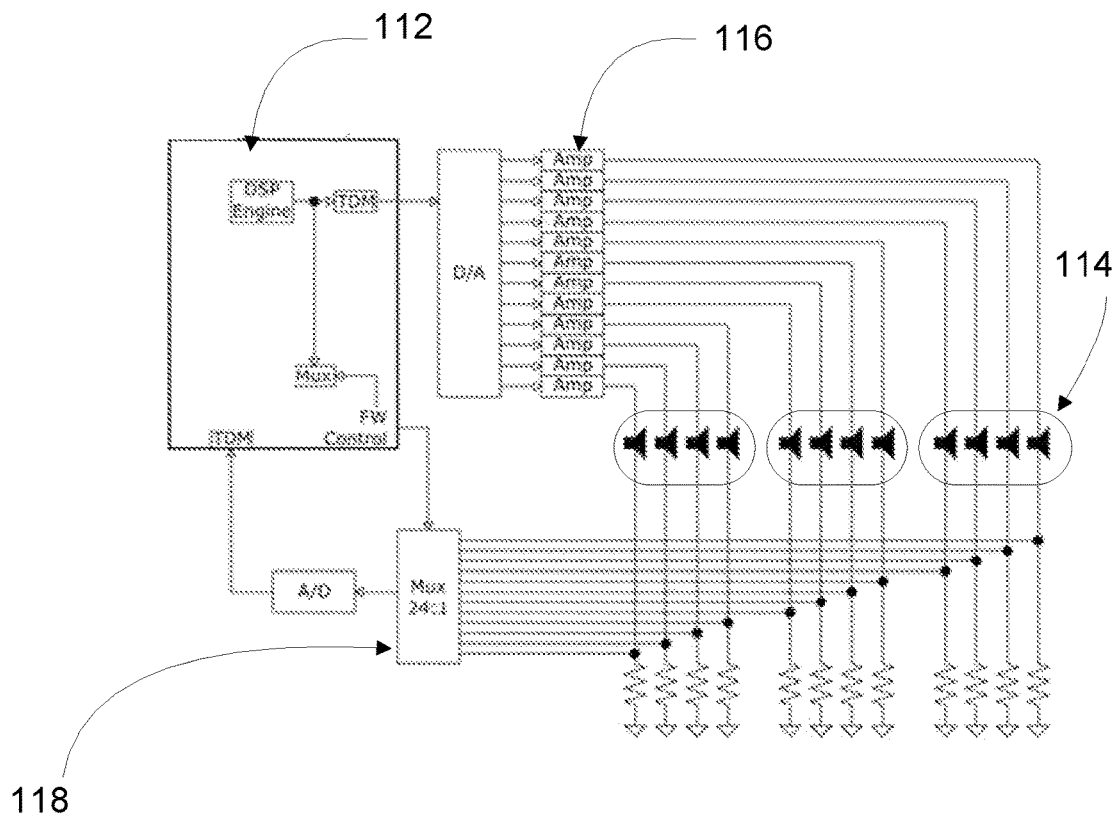
FIG. 1 illustrates an example speaker output faulting monitoring configuration according to example embodiments.

FIG. 1 illustrates an example speaker/emitter output faulting monitoring configuration according to example embodiments. Referring to FIG. 1, the example configuration 100 provides a system that includes a controller or central computer system to manage a plurality of speakers and provide speaker output fault monitoring in a particular environment. The system may provide signal management by monitoring the output of the DSP engine 112, which may include audio output and a specific audio tone. The output is monitored for each of the zones 114, which may include multiple speakers/emitters for each zone. The zones may include two, four, six or any number of zones managed by a centrally controlled circuit, such as a digital to analog converter and a corresponding amp 116, which is supplied to each signal output of emitter groups 114. When a channel of audio is identified as having a change in signal by the multiplexer 118 of the DSP, such as a change in impedance for any or all emitters, a signal output failure, a drop-out and/or a performance change, etc., then this may cause a determination that a fault has occurred.

Figure 2:
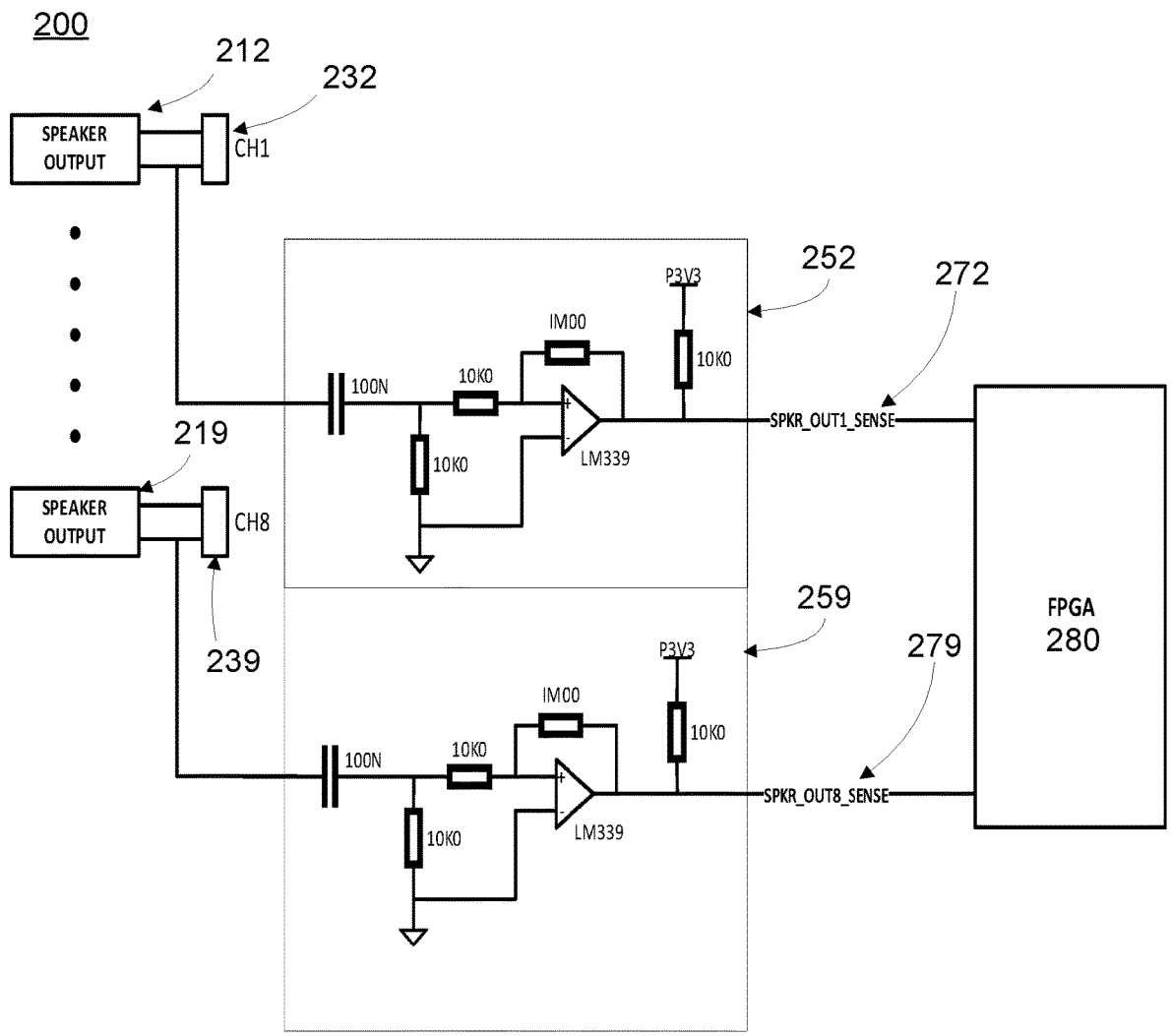
FIG. 2 illustrates an example speaker output faulting monitoring circuit configuration according to example embodiments.

FIG. 2 illustrates an example speaker output faulting monitoring configuration in detail according to example embodiments. Referring to FIG. 2, the configuration 200 includes an example where eight speaker outputs 212-219 and corresponding channels 232-239 are monitored by corresponding fault monitoring circuits 252-259 in communication with each channel 232-239. The output sensed signals 272-279 of each circuit may be processed by a processor or field programmable gate array (FPGA) 280 to identify whether a signal is not present due to a short circuit, or overcurrent from the amplifier circuit. In this example, there may be eight monitoring circuits with comparator devices and other components, and when no signal is detected from the speaker output an error signal will be identified.

Figure 3:
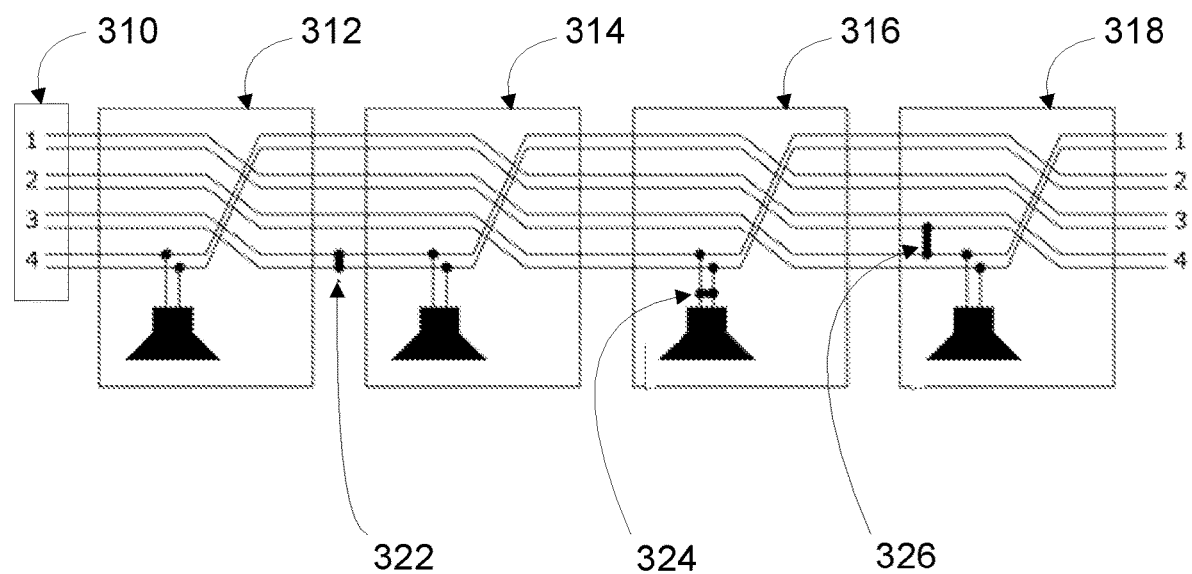
FIG. 3 illustrates an example short circuit configuration according to example embodiments.

FIG. 3 illustrates examples of various types of faults which are likely to occur in a configuration with multiple emitters. Referring to FIG. 3, the channels (1-4) 310 are setup as being connected with corresponding emitters/speakers 312-318. The process for identifying a failure/fault provides detecting if a channel has a short across it 322, this could also occur inside of an emitter or in the wires associated with a single emitter 324 or between the cables 326 passing between two different emitters or between lines of other emitters. The process for fault detection may not be able to distinguish which type of short (e.g., cable vs. emitter) has occurred, however, a short on the channel may still be identified. Shorts across channels, such as the "Ch1 shorted to Ch4", example 326 illustrated in the diagram, may yield unreliable results that may appear as shorts or open circuits on the channels involved.

One approach to identifying faults according to example embodiments may provide detecting short circuits when masking noise is not present by using a low frequency inaudible tone (i.e., 100 Hz tone) that is mixed with each passive emitter output. This type of tone is inaudible to people due to the combination of a low-level power and frequency with a large low frequency roll-off in the emitter frequency response. Another option would be to have a high frequency inaudible tone, such as in the kilohertz range (e.g., 20-30 kHz). The inaudible frequency is just a frequency that the amplifier can produce For passive emitters, one approach will detect if the impedance of a test procedure has changed significantly such that a problem can be identified. The definition of "significantly" will depend on the number of emitters on a cable run.

In one example, using the low frequency tone requires determining whether the masking noise is being provided by the emitters at a sufficient level. As a result, there are two modes of operation, first, when masking noise energy is available, the masking noise will be used to identify a "high confidence" impedance measurement. This first approach measures the masking noise level at a particular voltage and/or impedance level and determines whether the noise is at a particular masking noise threshold energy value and/or whether the impedance continues to be at a particular level. If so, this demonstrates the presence of a short or loss of signal, or alternatively, a system with no shorts or failures. Secondly, in another example, when the masking noise energy is too low (below the threshold energy value), a "low confidence" impedance measurement will be calculated instead. The masking noise may not be identified at a particular masking noise threshold level. This procedure would then rely on the 100-Hz tone signal injection that is also used by short circuit detection.

The procedure will detect if there is enough energy for a high confidence measurement (e.g., rely on a threshold voltage and/or impedance level), and when that threshold level is not present, an alternative approach will be to fall back to a low confidence measurement automatically. In the low confidence approach, when the procedure has identified a confidence value, it will be less likely to report a failure, and the injected tone will be measured for clarification as to whether there is a short. A high confidence measurement will detect a problem as small as one emitter on a full cable configuration (e.g., 60 emitters) becoming disconnected from the configuration. In contrast, a low confidence measurement will require a larger percentage of the emitters to become disconnected before being detected as a fault and thus the tone can be used as the basis for a failure on one or more of the emitter lines.

According to another example embodiment, the ratio of root means square (RMS) voltage to RMS current converges faster than the RMS current measurement alone, so this reduces the length of data needing to be captured for each channel. One approach is to predict the output voltage based on the digital samples being sent to a D/A converter. Normal operation of a multiple emitter system can include voltage clipping, and the non-linear amplifier output is modeled in the voltage prediction. In order to predict the non-linear output voltage of the amplifier based on the linear input to the amplifier, the DSP process generates the amplifier input and then models the amplifier's non-linearity and calculates the predicted output. That prediction is used as part of the fault monitoring calculation based on voltage data, as illustrated in FIGS. 4A and 4B.

Figure 4A:
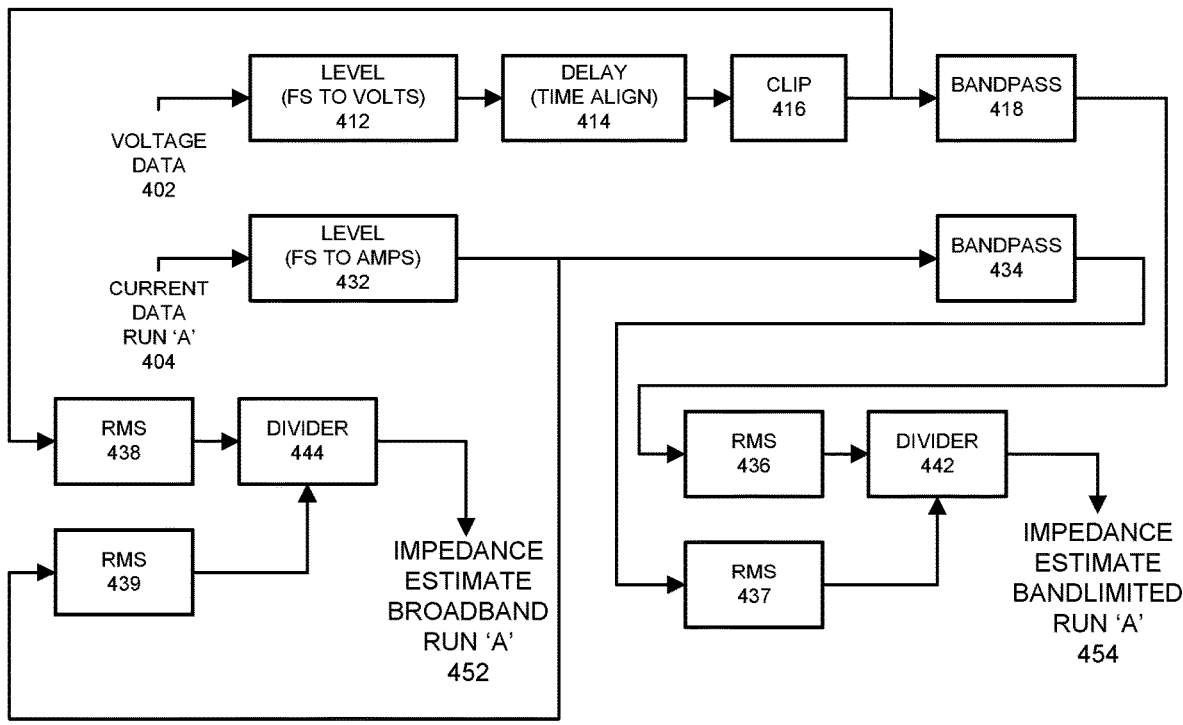
FIG. 4A illustrates a first speaker output faulting monitoring block diagram configuration according to example embodiments.
Figure 4A:
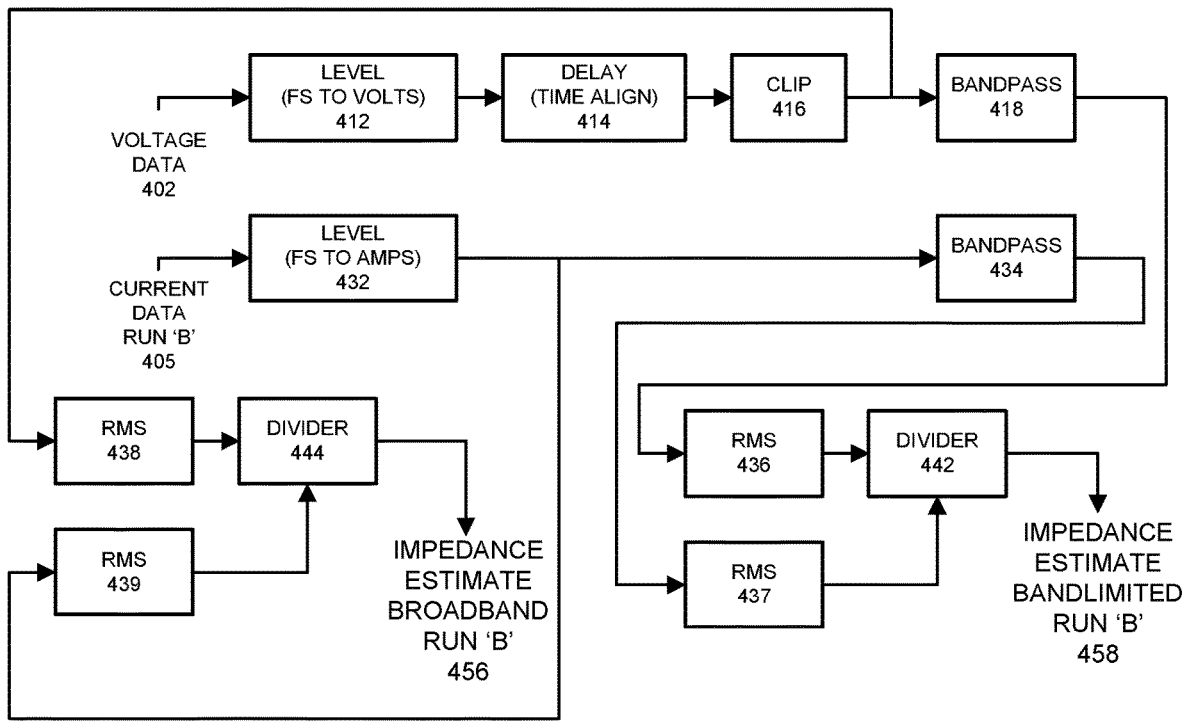
Figure 4B:
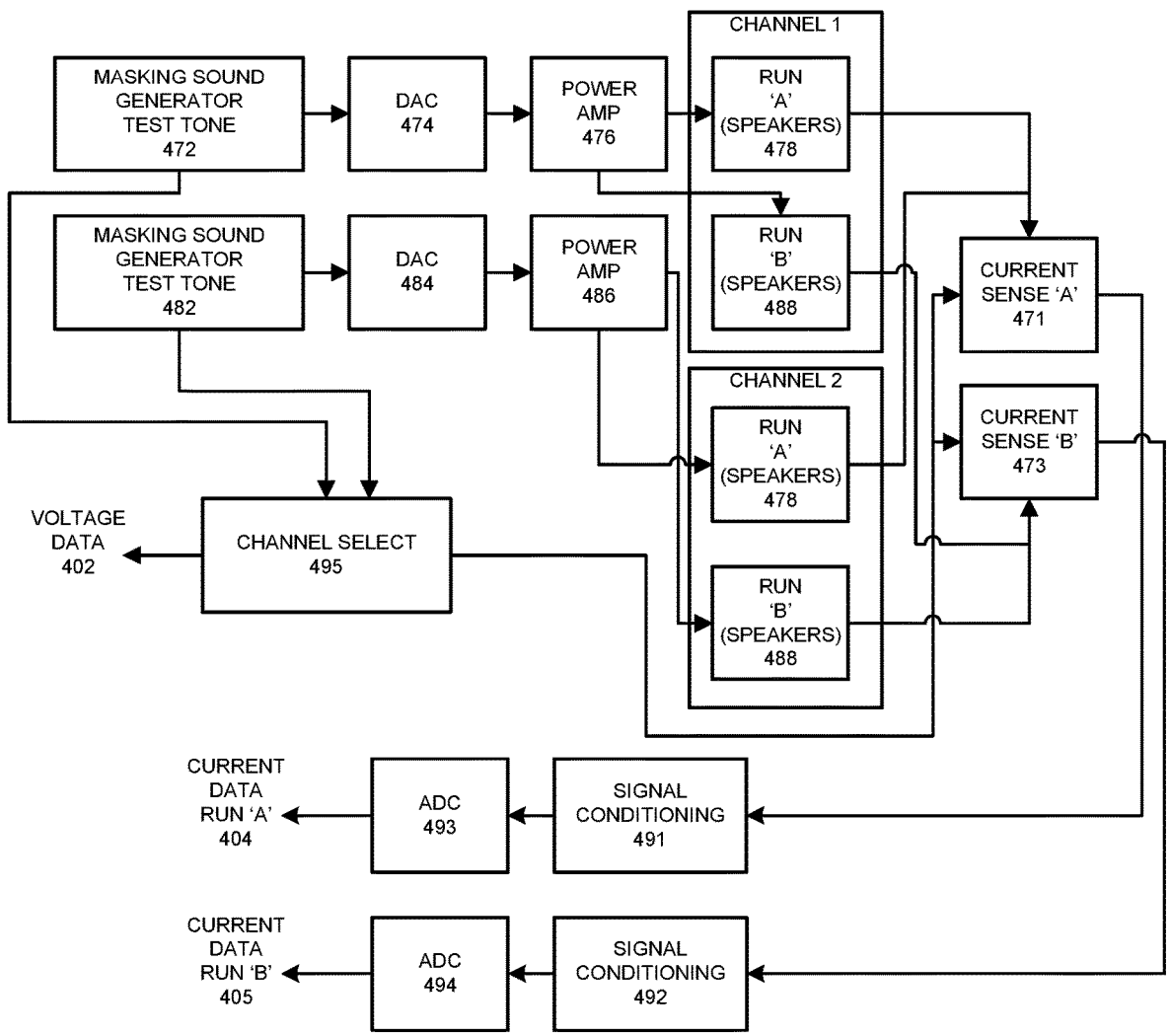
FIG. 4B illustrates a second speaker output faulting monitoring block diagram configuration according to example embodiments.

FIG. 4A illustrates an example speaker output faulting monitoring block diagram configuration according to example embodiments. Referring to FIG. 4A, the fault monitoring block diagram demonstrates the measurements which are taken and used to identify faults in a multi-emitter configuration. The input to the amplifier, in this example, is not a test tone as was used in other examples, but instead is a sound masking signal used to mask sound via one or more emitters. The fault detection circuit uses audio output to make the fault determination instead of attempting to inject a tone. The input for the first circuit (run 'A' impedance) may include a voltage data portion 402 (used by both the first and second circuits) and a current data portion 404 from each run 'A' group of emitters from each channel (1 . . . n channels). The full scale (FS) must be converted to volts 412 and amps 432 for both the voltage and current data 402/404. The voltage is delayed 414 so the voltage data and the current data can be synchronized. The voltage is clipped 416 to produce a model of the amplifier circuitry and how the amplifier changes the output voltage. The makes the voltage prediction more accurate. The signals for the voltage and current are then bandpass filtered 418/434 by bandpass circuit elements to create an impedance estimate for both bandpassed signals 454 and non-bandpass (broadband) signals 452.

The predicted voltage is delayed to align in time with the current sense measurement, otherwise there is high frequency noise in the measurement from taking the ratio of "new" voltage data against "old" current data. It is necessary to align the amplifier's predicted output voltage (predicted before the event) to the measured current flow that results from that voltage (measured during the event), and the time alignment makes the fault monitoring data more accurate. The broadband impedance estimate 452 is used for detecting issues such as circuit shorts, circuit opens, and multiple emitters becoming disconnected. However, it is limited since it is effectively an average of the impedance vs. frequency curve for the emitters. The estimate 452 is sensitive to interference such as temperature and the spectrum of the audio content. The bandlimited impedance estimate 454 permits the exclusion of the regions of the spectrum where variation may be high (e.g., frequencies where the emitter impedance will be more temperature sensitive) to increase consistency and accuracy. Additional signal processing is performed on the predicted voltage and the measured current to isolate a smaller frequency range of the sound masking data and to process that range of data. This frequency range is the "bandlimited" portion of FIG. 4A. By limiting the calculations to a range of frequencies where the speakers (emitters) are known to be stable across temperatures, the accuracy of the fault monitoring detection process is increased.

The process may include identifying energy levels and responding accordingly. If there is enough energy in the bandlimited region, the bandlimited impedance may be considered a "high confidence" estimate that is used to detect changes, which are potentially as small as one emitter being disconnected. Otherwise, using the broadband impedance 452 as a "low confidence" estimate provides a way to detect moderate changes (e.g., short circuit, open circuit, several emitters being disconnected, etc.).

One approach is to determine if there is enough energy (i.e., the volume of the system is loud enough) to permit the highly accurate bandlimited calculations 454 to provide the necessary feedback information for fault detection. If there is enough energy then the data may be considered high confidence data since the energy level is above a threshold energy value. If the energy is too low, the low confidence data provided by the full audio (broadband 452) band may be used. Also, by injecting a 100 Hz tone into the outputs, and not performing filtering to isolate the 100 Hz tone, an inaudible guarantee provides energy for the broadband impedance estimate.

Using the RMS measurements illustrated in the block diagrams of FIG. 4A, for example, if the RMS value of the bandpass filtered current data is near the noise floor of the current sensing hardware (i.e., below a minimum RMS current threshold), the data will not be reliable enough to provide a high enough confidence in the estimated impedance. The RMS calculations 436 and 437 are performed for the voltage data 402, and the RMS current data 404 and a divider is used 442 to create a ratio of RMS voltage to RMS current and to achieve the impedance estimate bandlimited 454. The RMS calculations are also performed 438 and 439 with a divider 444 to identify the ratio of RMS voltage to RMS current for the non-bandpassed signals to achieve the impedance estimate of the broadband signals 452. By comparing the RMS current against a threshold based on the measurement circuit noise floor, if the RMS current is below the threshold, it is considered a low confidence estimate. Checking the RMS voltage, a lower voltage will result in a lower current, so setting a minimum RMS voltage threshold is necessary. If the level of the RMS voltage is below the minimum RMS voltage threshold, the low-confidence estimate approach can then be used.

FIG. 4A demonstrates another circuit may be used for a separate run of emitters on each channel. All circuits may share a common set of voltage data, such as the masking sound generator providing a 100 Hz test tone, however, the current sense data 404 may be unique to each run (A, B, etc.) of emitters on the various channels. For example, in the first circuit the current sense data 404 is from each run 'A' of emitters on each channel, which may include a loop of first emitters on each a channel 1-n. The output may be the impedance for the 'A' run emitters for both broadband 452 and bandlimited data 454 The second circuit may receive current sense data 405 from a 'B' run of emitters, which represents a separate loop of emitters on each channel 1-n. The output of the second circuit may be the impedance 456 for broadband and bandlimited data 458 of the 'B' run of emitters. Each run of emitters, 'A', 'B', etc., may represent a loop of emitters setup on each channel which are connected separately and are monitored separately from other runs of emitters. This provides a way to monitor for faults on each channel and each respective run of each channel. The current sense for each of the runs can be monitored by each respective circuit. The number of runs and respective circuits in this example is two, however, one or more than two may be setup and monitored accordingly.

FIG. 4B illustrates the emitters and corresponding components according to example embodiments. Referring to FIG. 4B, the masking sound generators 472 and 482 provide test tones, such as 100 Hz signals to each emitter group (runs A, B, etc.). Each channel has a digital to analog converter 474/484 and a power amplifier 476/486. The 'A' speakers/emitters 478 on channels 1 and 2 are linked to determine a current sense value 471, which also receives a signal conditioning component 491 and analog to digital conversion 493 to produce a first set of current data. The current sense 'B' 473 measures the current data from run 'B' speakers/emitters 488 and the output is also subject to signal conditioning 492 and an ADC 494 to produce current data 405. The voltage data 402 is provided from each loop as part of a channel selection module 495.

Figure 5:
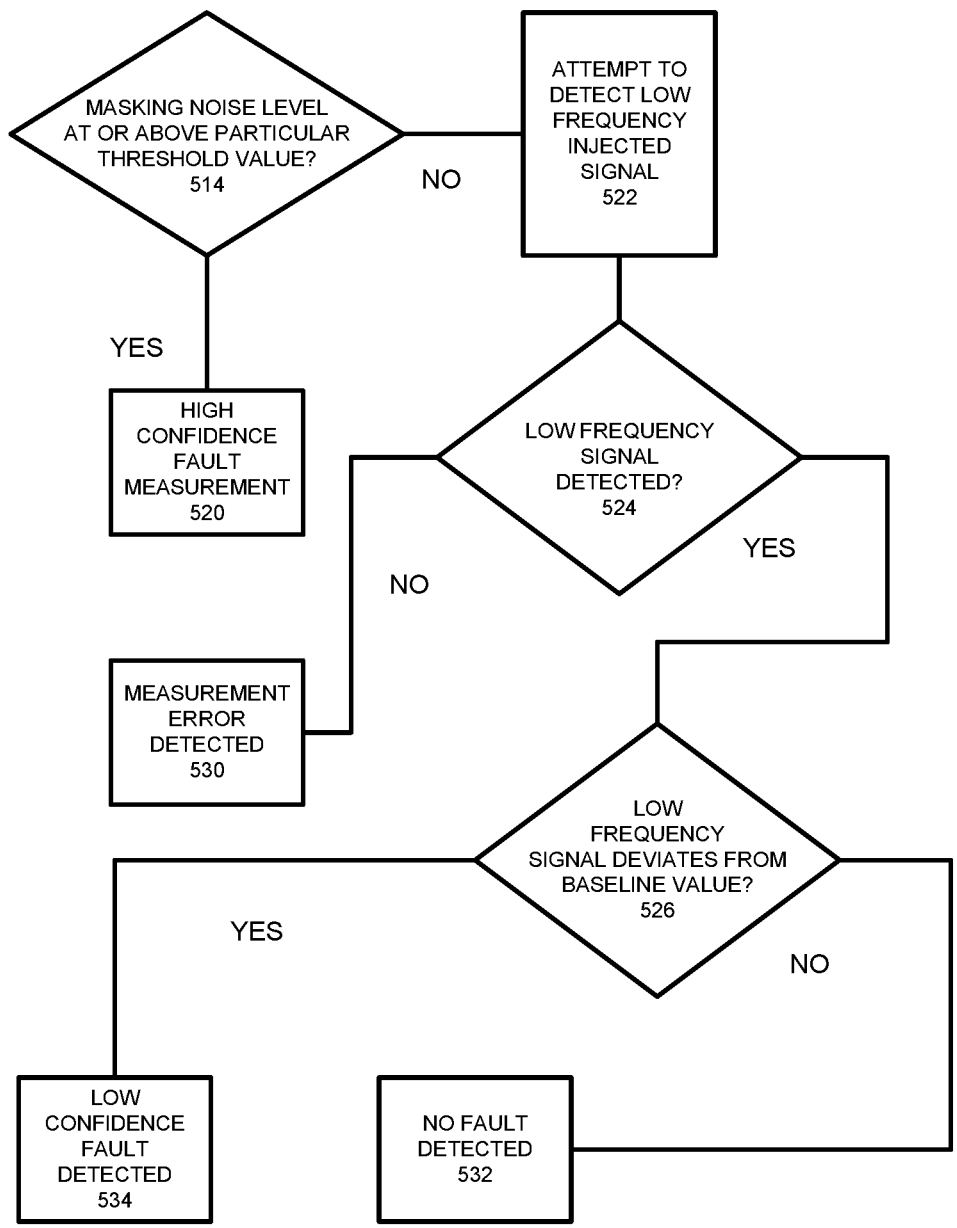
FIG. 5 illustrates a flow diagram of a process for monitoring and identifying a fault according to example embodiments.

FIG. 5 illustrates a flow diagram of a process for monitoring and identifying a fault according to example embodiments. Referring to FIG. 5, the process may include processing one or more audio signals to determine whether a masking noise signal is above a threshold value ($T_{MN}$) 514, and if so, the fault measurement is a high confidence value 520. If not, the process continues by attempting to detect 522 a low frequency injected signal (i.e., 100 Hz), or in another example a high frequency signal that is also inaudible, and if the low signal is not detected 524, a fault has occurred and an error may be provided as feedback 530, if it is detected, then then the low frequency signal is compared to a baseline value for low frequency signals and if the signal does deviate 526 by a predetermined margin (e.g., 'X' percent of more) then there is no fault detected 532. If the signal does deviate by that margin amount then the determination is that a low confidence fault is detected 534. This hybrid process begins with comparing the masking noise signal to a threshold value and then using a low frequency signal as an alternative approach when the masking signal is not at the value expected. In another example, the masking noise may not be required as a condition precedent to detect the inaudible tone. Instead, the system may be operational without a masking tone and the inaudible tone may be injected and detected when the system is operational.

Example embodiments may include a process that includes monitoring a plurality of audio channels, determining an energy level on the plurality of audio channels, identifying a fault on one or more of the plurality of audio channels based on the energy level, and determining whether the fault is a low confidence measurement or a high confidence measurement. The fault may include one or more of a short circuit or open circuit. The process may also include determining the energy level on the plurality of audio channels comprises determining whether masking noise is present on the plurality of audio channels. When the fault is determined to be a low confidence measurement, determining whether a low frequency tone signal is present on one or more of the plurality of audio channels. The process may also include determining the fault exists when the low frequency tone is not present on one or more of the plurality of audio channels, determining a masking noise is present, determining whether the masking noise is above a threshold energy level, and determining the fault is a high confidence measurement when the masking noise is above a threshold energy level. The process may also include determining the masking noise is present, determining whether the masking noise is above a threshold energy level, and determining the fault is a low confidence measurement when the masking noise is not above a threshold energy level.

Figure 6:
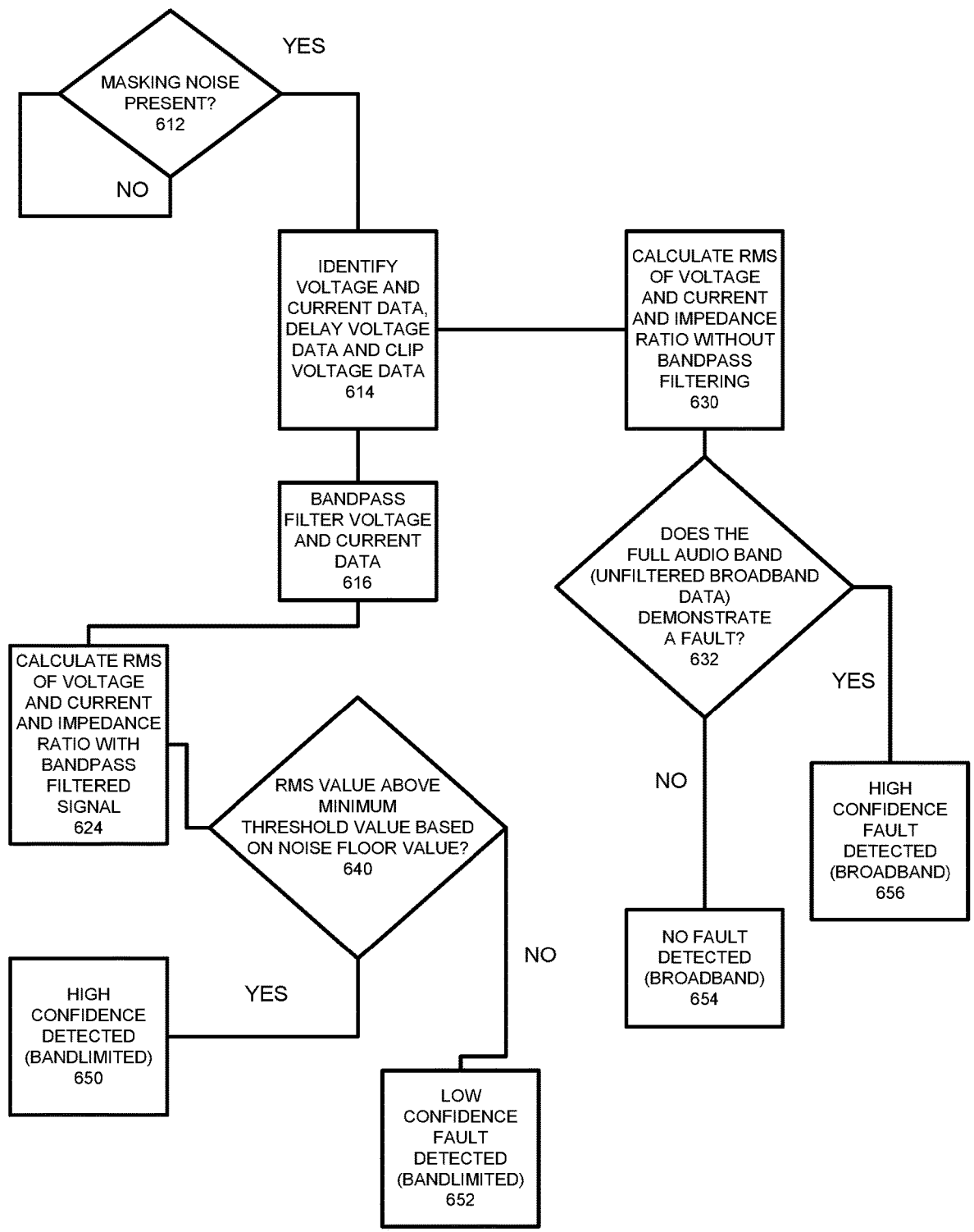
FIG. 6 illustrates a flow diagram of a process for monitoring and identifying a fault as a high or low confidence measurement according to example embodiments.

FIG. 6 illustrates a flow diagram of a process for monitoring and identifying a fault as a high or low confidence measurement according to example embodiments. Referring to FIG. 6, the process may include determining whether a masking noise is present 612 and if so, performing both a narrowband impedance determination measurement (filtered impedance analysis) and a broadband impedance determination measurement with no filtering. The filtered analysis may include identifying a voltage and current data input, such as of masking signals and delaying and clipping the voltage signal 614, the signals can then be bandpass-filtered 616 and a root means square (RMS) voltage for both current and voltage can be calculated 624 and divided to identify an impedance. When the RMS values are above a minimum voltage and/or current threshold value ($T_M$) 640, the fault may be considered with a high confidence 650 for the narrowband/bandlimited signal and, if not, the determination is a low confidence fault 652. As for the non-filtered broadband portion, the similar RMS voltage and current values may be identified 630 after operation 614 and a determination as to whether the broadband data is indicative of a fault, which may be determined based on the noise floor value of 650, the result may be no fault 654 if the fault is not identified and a high confidence fault 656, if the fault is detected. The results of the broadband and narrowband signals may be corroborated to identify the fault for both or used as two mutually exclusive sets of results to identify a fault.

One example embodiment may include a process that provides receiving a voltage input and a current input associated with one or more audio signals, bandpass filtering the voltage input and the current input, determining a root means square of the bandpass filtered portion, dividing the determined root means square of the voltage by the root means square of the current to identify an impedance value, and determining whether a fault has occurred based on the impedance value. The process may also include time delaying and clipping the voltage input prior to the bandpass filtering, determining a root means square of the voltage input and the current input without performing bandpass filtering, dividing the determined root means square of the non-filtered voltage by the root means square of the non-filtered current to identify a non-filtered impedance value, and determining whether a fault has occurred based on the non-filtered impedance value. The impedance value may correspond to a narrowband signal. The non-filtered impedance value may correspond to a broadband signal. The process may also include determining a fault has occurred with a high confidence designation when the impedance value is above a noise floor threshold value, and determining a fault has occurred with a high confidence designation when the non-filtered impedance value demonstrates a fault.

Figure 7A:
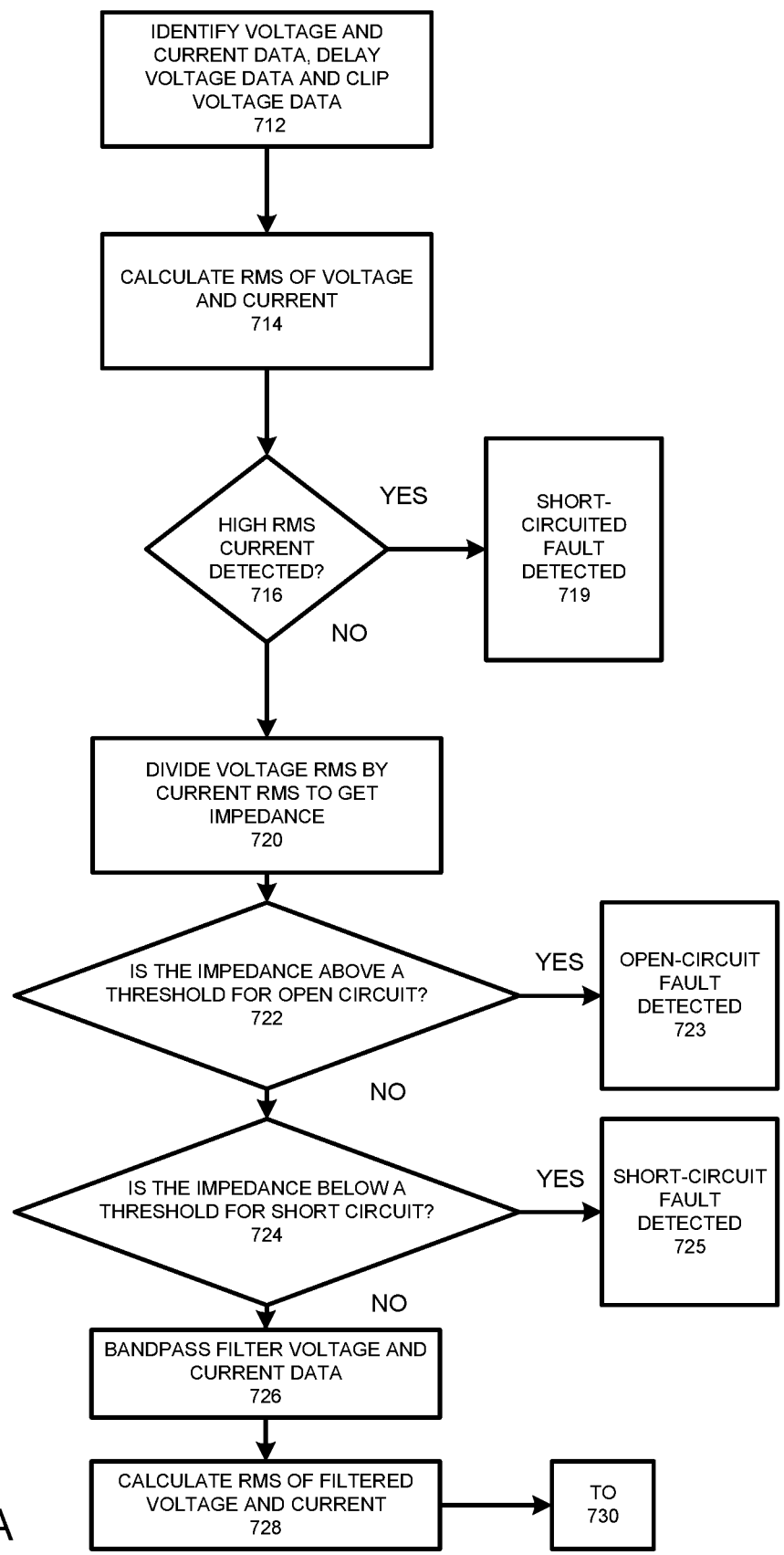
FIG. 7A illustrates a first part of an example flow diagram of a fault detection process in accordance with example embodiments.

FIG. 7A illustrates a first part of an example flow diagram of a fault detection process in accordance with example embodiments. Referring to FIG. 7A, the process includes identifying voltage and current data, delayed voltage data and clipped voltage data 712 for various emitters managed by a centrally controlled computing device. The root means square (RMS) values are calculated for the voltage and current data 714. When a high RMS current is detected, such as one exceeding a RMS threshold value, the conclusion may be made that there is a short circuit 719. If no high RMS value is detected, the voltage RMS may be divided by the current RMS to obtain the impedance 720 which can then be measured to be above a threshold which identifies an open circuit 723 or below a threshold 724 which may still indicate a short circuit 725. However, if not above or below the threshold values, then the bandpass filtered voltage and current data 726 may be identified and used to calculate a RMS of the filtered data 728. The process continues on 730 of FIG. 7B.

Figure 7B:
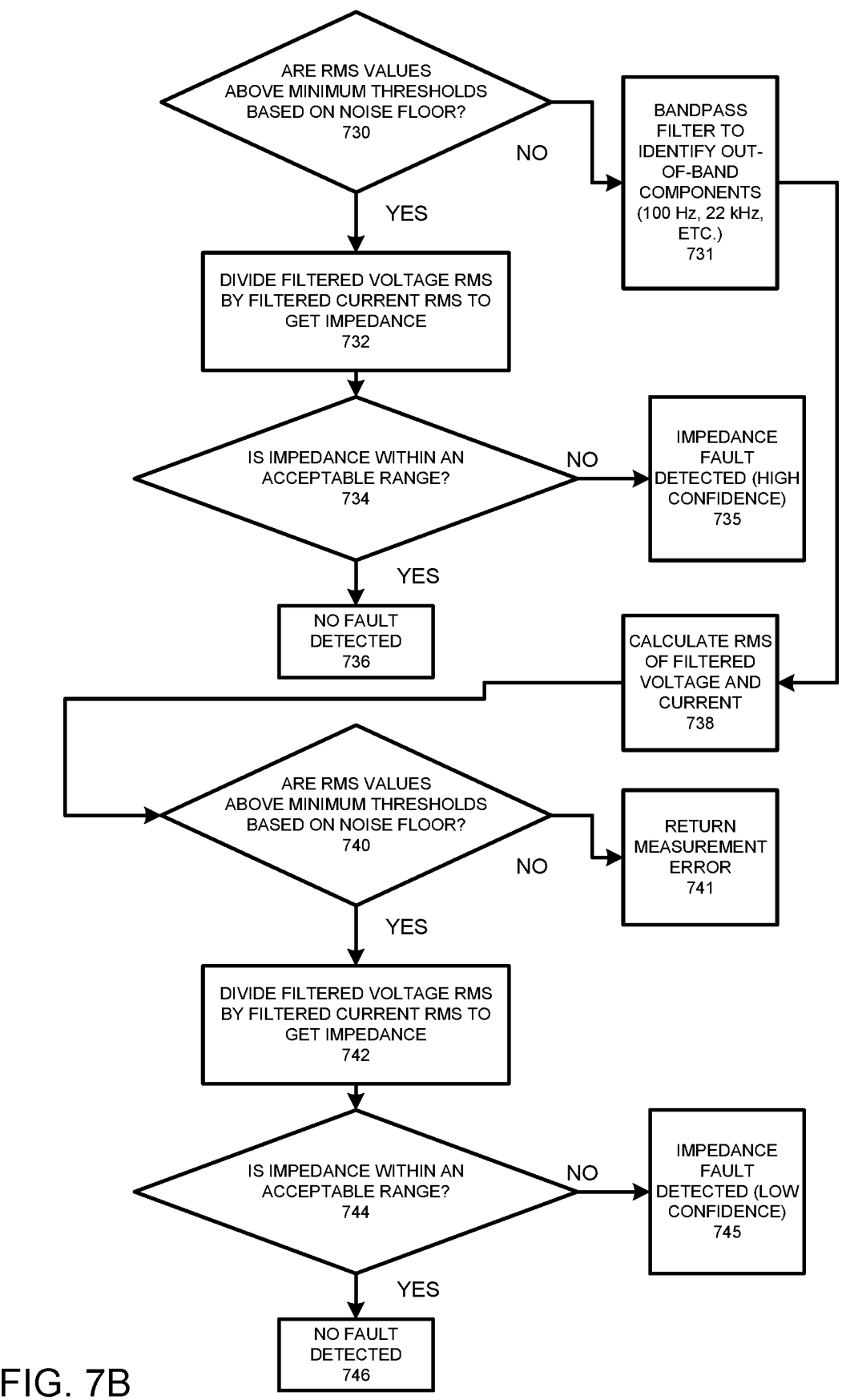
FIG. 7B illustrates a second part of an example flow diagram of a fault detection process in accordance with example embodiments.

FIG. 7B illustrates a second part of an example flow diagram of a fault detection process in accordance with example embodiments. Referring to FIG. 7B, the RMS values are determined to be above a minimum threshold based on a noise floor 730. If so, the filtered voltage RMS data is divided by filtered current RMS data to obtain an impedance 732 and the impedance is determined to be within an acceptable range 734 or not. If so, there is no fault 736. If the RMS values are not above a minimum threshold then the signal may be bandpass filtered to identify the low or high frequency components 731 and a RMS value is calculated for filtered voltage and current 738. Next, RMS values are determined to be above minimum thresholds based on a noise floor 740. If not above, then the measurement is an error 741. If values are above, the filtered voltage RMS and current RMS are divided to obtain an impedance value 742. If the impedance is in an acceptable range 744 there is no fault 746. If not within an acceptable range of impedance 745, then a low confidence is detected.

It is important to note that all the flow diagrams and corresponding processes derived from FIGS. 5, 6, 7A and 7B may be part of a same process or may share sub-processes with one another thus making the diagrams combinable into a single preferred embodiment that does not require any one specific operation but which performs certain operations from one example process and from one or more additional processes. All the example processes are related to the same physical audio system and can be used separately or interchangeably.

One example embodiment may include monitoring a plurality of audio channels, determining an energy level of the plurality of audio channels, identifying a fault of one or more of the plurality of audio channels based on the energy level, and determining whether the fault is a low confidence measurement or a high confidence measurement. The energy level may be digital output sampled data, output voltage, output current or a combination of all such values outputted from the detection circuits described herein. The fault may include one or more of a short circuit or open circuit. The determining the energy level on the plurality of audio channels may include determining whether masking noise is present on the plurality of audio channels. When the fault is determined to be a low confidence measurement, the process may perform determining whether a low frequency tone signal is present on one or more of the plurality of audio channels. The tone signal identified may also be a high frequency tone that is inaudible. The low frequency tone may be 100 Hz and the high frequency tone may be 22 kHz both inaudible to a human ear. The process may also include determining the fault exists when the low frequency tone is not present on one or more of the plurality of audio channels, determining a masking noise is present, determining whether the masking noise is above a threshold energy level, and determining the fault is a high confidence measurement when the masking noise is above a threshold energy level, determining the masking noise is present, determining whether the masking noise is above a threshold energy level, and determining the fault is a low confidence measurement when the masking noise is not above a threshold energy level.

According to another example embodiment a process may include receiving a voltage input and a current input associated with one or more audio signals, bandpass filtering the voltage input and the current input, determining a root means square of the bandpass filtered portion, dividing the determined root means square of the voltage by the root means square of the current to identify an impedance value, and determining whether a fault has occurred based on the impedance value. The process may also include time delaying and clipping the voltage input prior to the bandpass filtering, determining a root means square of the voltage input and the current input without performing bandpass filtering, dividing the determined root means square of the non-filtered voltage by the root means square of the non-filtered current to identify a non-filtered impedance value, and determining whether a fault has occurred based on the non-filtered impedance value.

The impedance value corresponds to a narrowband signal and the non-filtered impedance value corresponds to a broadband signal. The process may also include determining a fault has occurred with a high confidence designation when the voltage or the current value is above a noise floor threshold value, and determining a fault has occurred with a high confidence designation when the non-filtered impedance value demonstrates a fault.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 8:
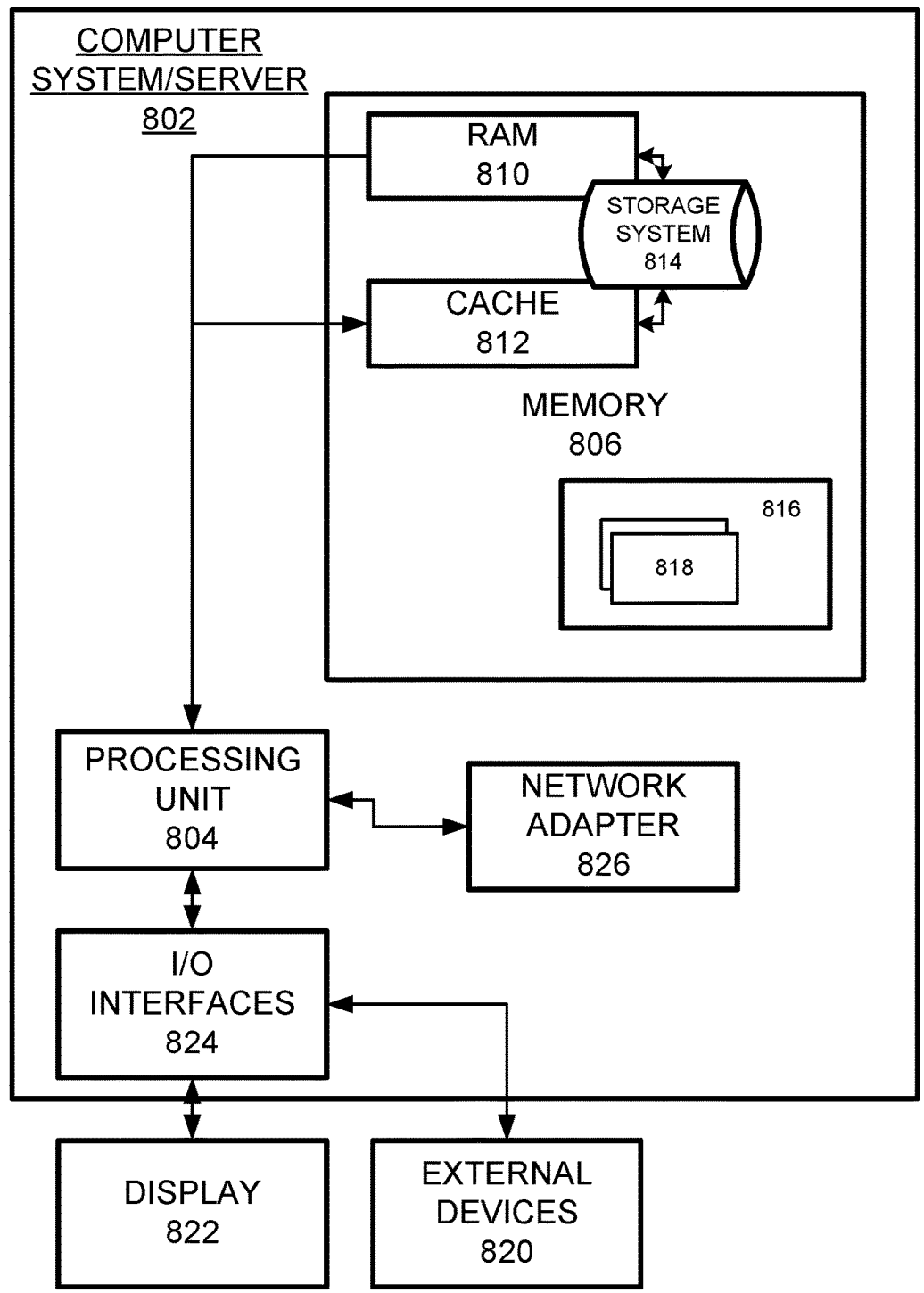
FIG. 8 illustrates an example system configuration configured to perform one or more processes in accordance with the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 8, computer system/server 802 in cloud computing node 800 is displayed in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not displayed, other hardware and/or software components could be used in conjunction with computer system/server 802. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
receiving a voltage input and a current input associated with one or more audio signals;
bandpass filtering the voltage input and the current input;
determining a root means square of the bandpass filtered portion;
dividing the determined root means square of the voltage by the root means square of the current to identify an impedance value; and
determining whether a fault has occurred based on the impedance value;
wherein the voltage input is time delayed and clipped prior to the bandpass filtering.

2. The method of claim 1, comprising
determining a root means square of the voltage input and the current input without performing bandpass filtering;
dividing the determined root means square of the non-filtered voltage by the root means square of the non-filtered current to identify a non-filtered impedance value; and
determining whether a fault has occurred based on the non-filtered impedance value.

3. The method of claim 1, wherein the impedance value corresponds to a narrowband signal.

4. The method of claim 2, wherein the non-filtered impedance value corresponds to a broadband signal.

5. The method of claim 1, comprising
determining a fault has occurred with a high confidence designation when the voltage or the current value is above a noise floor threshold value.

6. The method of claim 2, comprising
determining a fault has occurred with a high confidence designation when the non-filtered impedance value demonstrates a fault.

7. An apparatus comprising:
a receiver configured to receive a voltage input and a current input associated with one or more audio signals; and
a processor configured to bandpass filter the voltage input and the current input;
determine a root means square of the bandpass filtered portion;
divide the determined root means square of the voltage by the root means square of the current to identify an impedance value; and
determine whether a fault has occurred based on the impedance value;
wherein the voltage input is time delayed and clipped prior to the bandpass filtering.

8. The apparatus of claim 7, wherein the processor is further configured to
determine a root means square of the voltage input and the current input without a bandpass filter operation;
divide the determined root means square of the non-filtered voltage by the root means square of the non-filtered current to identify a non-filtered impedance value; and
determine whether a fault has occurred based on the non-filtered impedance value.

9. The apparatus of claim 7, wherein the impedance value corresponds to a narrowband signal.

10. The apparatus of claim 8, wherein the non-filtered impedance value corresponds to a broadband signal.

11. The apparatus of claim 7, wherein the processor is further configured to
determine a fault has occurred with a high confidence designation when the voltage or current value is above a noise floor threshold value.

12. The apparatus of claim 8, wherein the processor is further configured to
determine a fault has occurred with a high confidence designation when the non-filtered impedance value demonstrates a fault.

13. A non-transitory computer readable storage medium configured to store instructions that when executed cause a processor to perform:
receiving a voltage input and a current input associated with one or more audio signals;
bandpass filtering the voltage input and the current input;
determining a root means square of the bandpass filtered portion;
dividing the determined root means square of the voltage by the root means square of the current to identify an impedance value; and
determining whether a fault has occurred based on the impedance value;
wherein the voltage input is time delayed and clipped prior to the bandpass filtering.

14. The non-transitory computer readable storage medium of claim 13, wherein the processor is further configured to perform
determining a root means square of the voltage input and the current input without performing bandpass filtering;
dividing the determined root means square of the non-filtered voltage by the root means square of the non-filtered current to identify a non-filtered impedance value; and
determining whether a fault has occurred based on the non-filtered impedance value.

15. The non-transitory computer readable storage medium of claim 13, wherein the impedance value corresponds to a narrowband signal.

16. The non-transitory computer readable storage medium of claim 14, wherein the non-filtered impedance value corresponds to a broadband signal.

17. The non-transitory computer readable storage medium of claim 13, wherein the processor is further configured to perform
determining a fault has occurred with a high confidence designation when the voltage or current value is above a noise floor threshold value.

* * * * *